(12) United States Patent
Uehara

(10) Patent No.: US 11,808,315 B2
(45) Date of Patent: Nov. 7, 2023

(54) TORQUE LIMITER EMBEDDED DAMPER DEVICE

(71) Applicant: EXEDY Corporation, Neyagawa (JP)

(72) Inventor: Hiroshi Uehara, Neyagawa (JP)

(73) Assignee: Exedy Corporation, Osaka (JP)

( * ) Notice: Subject to any disclaimer, the term of this patent is extended or adjusted under 35 U.S.C. 154(b) by 247 days.

(21) Appl. No.: 17/322,190

(22) Filed: May 17, 2021

(65) Prior Publication Data

US 2021/0388873 A1    Dec. 16, 2021

(30) Foreign Application Priority Data

Jun. 16, 2020   (JP) .................................. 2020-103834

(51) Int. Cl.
| | | |
|---|---|---|
| F16D 7/02 | (2006.01) | |
| F16D 3/12 | (2006.01) | |
| F16F 15/129 | (2006.01) | |
| F16F 15/123 | (2006.01) | |
| F16F 15/139 | (2006.01) | |

(52) U.S. Cl.
CPC ............ F16D 7/025 (2013.01); F16D 3/12 (2013.01); F16F 15/1292 (2013.01); F16F 15/12353 (2013.01); *F16D 2300/22* (2013.01); *F16F 15/1297* (2013.01); *F16F 15/1397* (2013.01); *F16F 2222/04* (2013.01); *F16F 2232/02* (2013.01)

(58) Field of Classification Search
CPC ........ F16D 7/025; F16D 3/12; F16D 2300/22; F16F 15/12353; F16F 15/1292; F16F 15/1297; F16F 15/1397; F16F 2222/04; F16F 2232/02

USPC ........................................................ 464/68.1
See application file for complete search history.

(56) References Cited

U.S. PATENT DOCUMENTS

| | | | | |
|---|---|---|---|---|
| 8,257,183 B2* | 9/2012 | Inoshita | .............. | F16F 15/1297 464/46 |
| 8,858,345 B2* | 10/2014 | Sugiyama | ............... | F16D 7/025 464/46 |

FOREIGN PATENT DOCUMENTS

JP        2013-024364 A        2/2013

* cited by examiner

*Primary Examiner* — Greg Binda
(74) *Attorney, Agent, or Firm* — United IP Counselors, LLC

(57) ABSTRACT

A torque limiter embedded damper device includes a torque limiter unit and a damper unit. The damper unit includes a first rotor, a second rotor, and a stopper mechanism. The second rotor includes a flange axially opposed to the first rotor. The stopper mechanism restricts an angle of relative rotation between the first rotor and the second rotor to a predetermined angular range. The stopper mechanism includes a cutout and a stop pin. The cutout is provided in the flange of the second rotor. The stop pin is fixed to the first rotor. The torque limiter unit includes a friction plate having an annular shape. The annular friction plate is fixed at an inner peripheral part thereof to an outer peripheral part of first rotor or the second rotor by a fixation member. The fixation member is fastened in a state of penetrating the cutout of the flange.

6 Claims, 3 Drawing Sheets

TORQUE LIMITER EMBEDDED DAMPER DEVICE

CROSS-REFERENCE TO RELATED APPLICATIONS

This application claims priority to Japanese Patent Application No. 2020-103834, filed Jun. 16, 2020. The entire contents of that application are incorporated by reference herein in their entirety.

TECHNICAL FIELD

The present invention relates to a damper device, particularly to a torque limiter embedded damper device provided between a power source-side member and an output-side member.

BACKGROUND ART

A type of hybrid vehicle including an engine and an electric motor, for instance, uses such a torque limiter embedded damper device as described in Japan Laid-open Patent Application Publication No. 2013-24364 in order to prevent transmission of an excessive torque from an output side to an engine side in engine start and so forth.

The torque limiter embedded damper device described in Japan Laid-open Patent Application Publication No. 2013-24364 is provided with a damper part, including a pair of plates and a plurality of torsion springs, and a torque limiter disposed on an outer peripheral side of the damper part. The damper part and the torque limiter are coupled by rivets. When described in detail, a lining plate of the torque limiter and a pair of side plates of the damper part are all fixed by a single type of rivets.

Such a type of torque limiter embedded damper device is configured such that the lining plate of the torque limiter is disposed further radially outside the pair of side plates of the damper part. Hence, reduction in radial dimension of the device is made difficult.

Besides, in manufacturing the torque limiter embedded damper device, it is preferred to assemble the torque limiter unit and the damper unit separately from each other and then combine both the units to each other. However, in the damper device described in Japan Laid-open Patent Application Publication No. 2013-24364, due to a similar reason to the above, the torque limiter unit and the damper unit cannot be combined to each other after assembled separately from each other.

BRIEF SUMMARY

It is an object of the present invention to achieve compactness in radial dimension of a torque limiter embedded damper device including a torque limiter unit and a damper unit, and simultaneously, enable the torque limiter unit and the damper unit to be combined to each other after assembling both the units separately from each other.

(1) A torque limiter embedded damper device according to the present invention is provided between a power source-side member and an output-side member. The torque limiter embedded damper device includes a damper unit and a torque limiter unit. The damper unit is coupled to the output-side member. The torque limiter unit limits a torque transmitted between the power source-side member and the damper unit. The damper unit includes a first rotor, a second rotor, a stopper mechanism, and an elastic member. The first rotor has a disc shape. The second rotor includes a flange axially opposed to the first rotor. The second rotor is rotatable relative to the first rotor. The second rotor is coupled to the output-side member. The stopper mechanism includes a cutout and a stop pin. The cutout is provided in the flange and extends in a circular-arc shape. The stop pin is fixed to the first rotor. The stop pin axially penetrates the cutout. The stopper mechanism restricts relative an angle of rotation between the first rotor and the second rotor to a predetermined angular range. The elastic member elastically couples the first rotor and the second rotor in a rotational direction. The torque limiter unit includes a friction plate having an annular shape. The friction plate is fixed at an inner peripheral part thereof to an outer peripheral part of either the first rotor or the second rotor by a fixation member. The fixation member is fastened while penetrating the cutout of the flange.

In the present device, the second rotor is configured such that the fixation member, by which the torque limiter unit and the damper unit are fixed, penetrates the cutout of the stopper mechanism. In other words, the torque limiter unit and the damper unit are combined by utilizing the cutout penetrated by the stop pin, while the inner peripheral part of the torque limiter unit and the outer peripheral part of the damper unit overlap each other. Therefore, unlike a well-known device, the present device can realize compactness in radial dimension thereof. Besides, due to a similar reason to the above, the torque limiter unit and the damper unit can be combined to each other after assembled separately from each other.

(2) Preferably, the first rotor includes a first plate and a second plate. The first and second plates each have a disc shape. The first and second plates are disposed to axially interpose the flange therebetween. The first and second plates are fixed to each other by the stop pin so as to be axially immovable and non-rotatable relative to each other.

(3) Preferably, the friction plate is fixed to the first plate, and the second plate includes an assembling hole enabling the fixation member to penetrate therethrough. Here, the fixation member, by which the friction plate and the first plate are fixed, is fastened through the assembling hole of the second plate and the cutout of the flange.

(4) Preferably, the fixation member and the elastic member are each disposed to overlap in part an imaginary circle with a radius defined by an attachment position of the stop pin.

(5) Preferably, the cutout of the stop mechanism is an elongated hole having a circular-arc shape. The elongated hole is provided with a protruding portion recessed radially outward from a circumferential part thereof. The fixation member penetrates not only the elongated hole but also the protruding portion.

(6) Preferably, the torque limiter unit includes a fixation plate, a pressure plate, and an urging member. The fixation plate is fixed to the power source-side member. The pressure plate presses the friction plate against the fixation plate. The urging member presses the friction plate against the fixation plate through the pressure plate.

Overall, according to the present invention described above, a torque limiter embedded damper device, including a torque limiter unit and a damper unit, can be made compact in radial dimension, and simultaneously, both the units can be combined to each other after assembled separately from each other.

DETAILED DESCRIPTION

[Entire Configuration]

Figure 1:
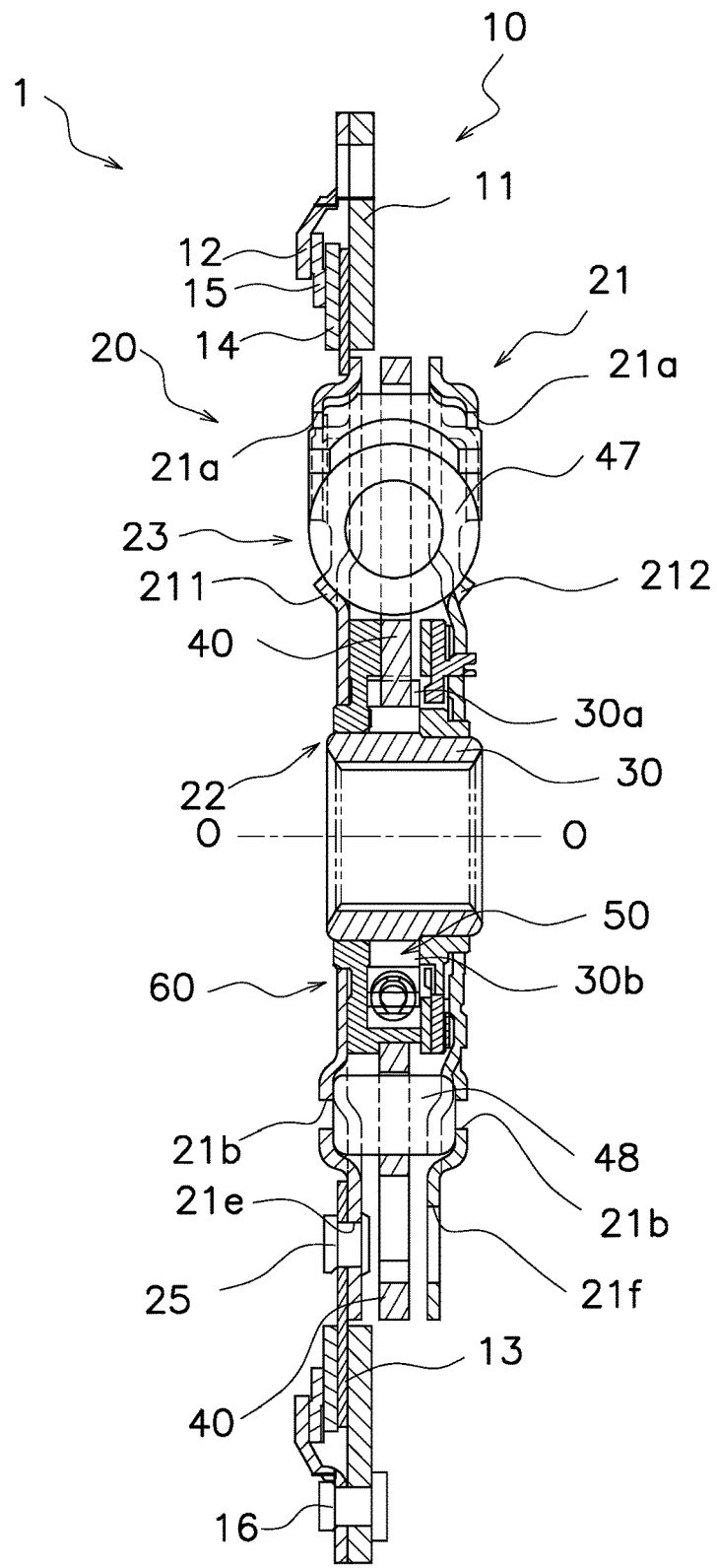
FIG. 1 is a cross-sectional view of a torque limiter embedded damper device according to a preferred embodiment of the present invention, taken through Line I-O-I of FIG. 3.
Figure 2:
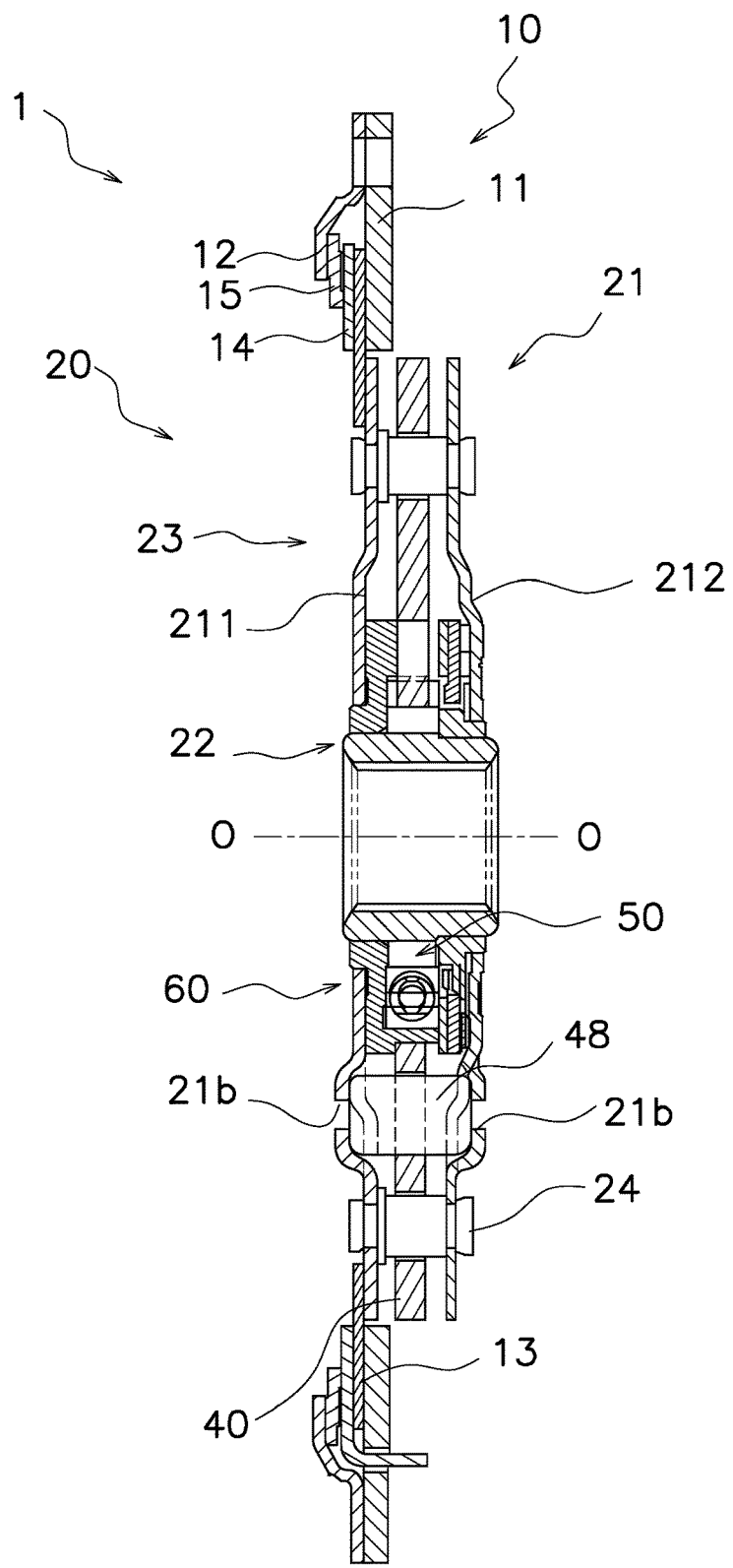
FIG. 2 is a cross-sectional view of the torque limiter embedded damper device taken through Line II-O-II of FIG. 3.
Figure 3:
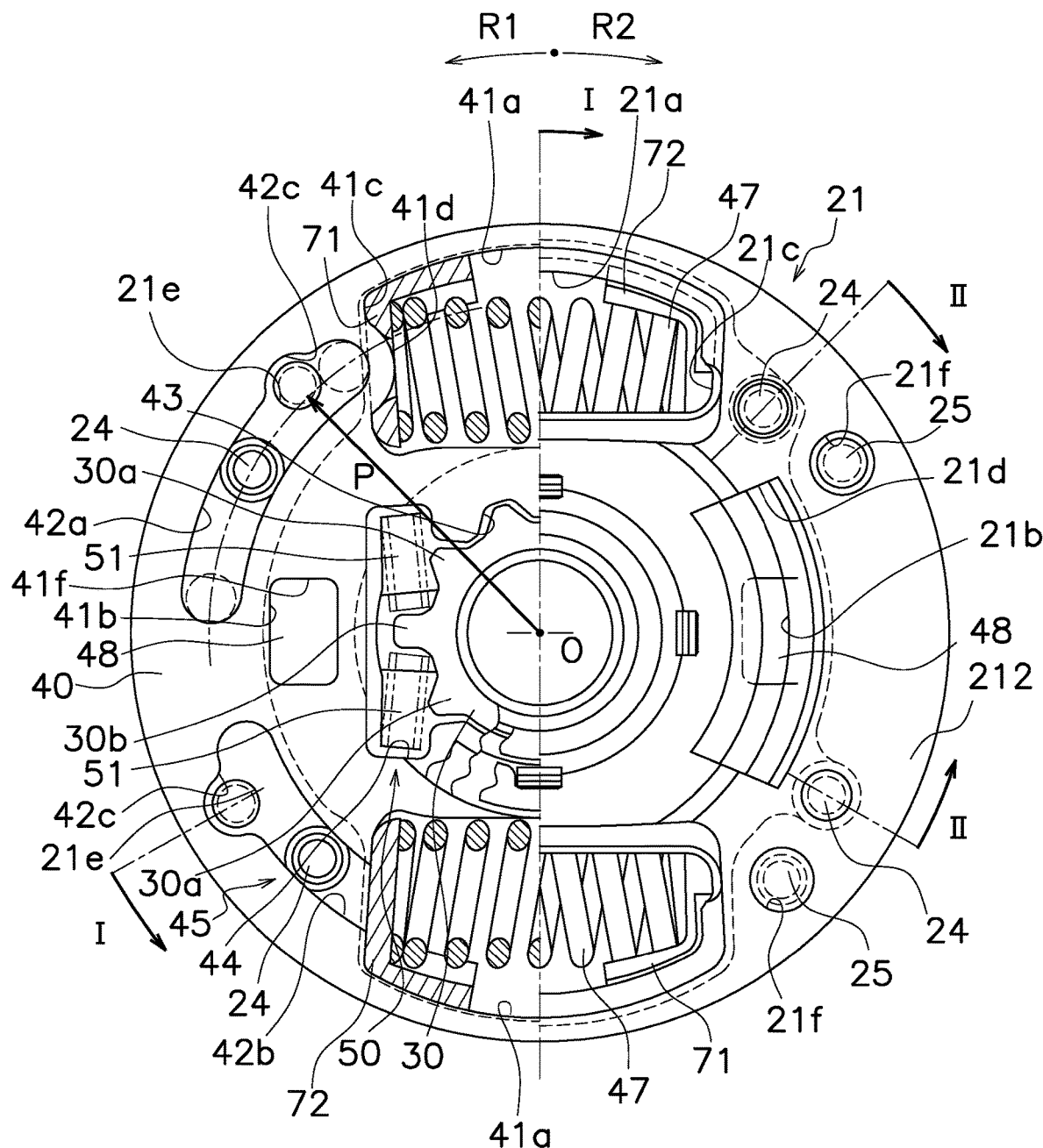
FIG. 3 is a front view of a damper unit.

FIGS. 1 and 2 are cross-sectional views of a torque limiter embedded damper device 1 (hereinafter simply referred to as "damper device 1" on an as-needed basis) according to a preferred embodiment of the present invention. On the other hand, FIG. 3 is a front view of the damper device 1 in a condition that some constituent members are detached therefrom or are not illustrated in part. In FIGS. 1 and 2, line O-O indicates a rotational axis. In FIGS. 1 and 2, an engine is disposed on the left side of the damper device 1, whereas a drive unit, including an electric motor, a transmission, and so forth, is disposed on the right side of the damper device 1.

It should be noted that in the following explanation, the term "axial direction" refers to an extending direction of the rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on each of window portions and each of window holes, both of which are illustrated in FIG. 3. Likewise, the radial direction is not required to be perfectly matched with a diameter direction of the imaginary circle about the rotational axis O, and is conceptualized as encompassing, for instance, an up-and-down direction defined based on each window portion and each window hole, both of which are illustrated in FIG. 3.

The damper device 1 is a device provided between a flywheel and an input shaft of the drive unit (both of which are not illustrated in the drawings) in order to limit a torque transmitted between the engine and the drive unit and attenuate rotational fluctuations. The damper device 1 includes a torque limiter unit 10 and a damper unit 20.

[Torque Limiter Unit 10]

The torque limiter unit 10 is disposed on the outer peripheral side of the damper unit 20. The torque limiter unit 10 limits a torque transmitted between the flywheel and the damper unit 20. The torque limiter unit 10 includes a first fixation plate 11 (exemplary fixation plate), a second fixation plate 12, a friction plate 13, a pressure plate 14, and a cone spring 15 (exemplary urging member).

The first fixation plate 11 is fixed to a power source-side member. The first fixation plate 11 and the second fixation plate 12 are fixed to each other by a plurality of rivets 16. The friction plate 13 is an annular plate. The pressure plate 14 and the cone spring 15 are disposed between the second fixation plate 12 and the friction plate 13. The cone spring 15 presses the friction plate 13 against the first fixation plate 11 through the pressure plate 14.

[Damper Unit 20]

The damper unit 20 is composed of an input-side plate 21 (exemplary first rotor), a hub flange 22 (exemplary second rotor), and a damper part 23 disposed between the input-side plate 21 and the hub flange 22.

<Input-Side Plate 21>

The input-side plate 21 includes a first plate 211 and a second plate 212 (both of which will be hereinafter collectively referred to as "the input-side plate 21" on an as-needed basis). As shown in FIG. 3, each of the first and second plates 211 and 212 is an annular member having a center hole. It should be noted that FIG. 3 depicts only the second plate 212 but the basic configuration of the second plate 212 is similarly true of the first plate 211. The first and second plates 211 and 212 are fixed to each other at a predetermined axial interval by four stop pins 24 (see FIG. 3). Therefore, the first and second plates 211 and 212 are immovable relative to each other in both axial and rotational directions. Besides, as shown in FIG. 1, the inner peripheral part of the friction plate 13 is fixed to the outer peripheral part of the first plate 211 by four rivets 25 (exemplary fixation member).

As shown in FIG. 3, each of the first and second plates 211 and 212 is provided with a pair of first window portions 21a and a pair of second window portions 21b. The pair of first window portions 21a is disposed in opposition to each other through the rotational axis O. FIG. 3 depicts the pair of first window portions 21a and one of the pair of second window portions 21b in the second plate 212 but the configurations of the window portions 21a and 21b are similarly true of those in the first plate 211. The pair of first window portions 21a is formed by cutting and raising each plate 211, 212. Each first window portion 21a includes a pair of pressing surfaces 21c on both circumferential end surfaces thereof and includes a pair of support portions on the outer and inner peripheral edges thereof. On the other hand, the pair of second window portions 21b is disposed in opposition to each other through the rotational axis O, while being displaced from the pair of first window portions 21a at an angular interval of 90 degrees. The pair of second window portions 21b is a pair of openings each having a circular-arc shape. Each second window portion 21b circumferentially extends and axially penetrates each plate 211, 212. Each second window portion 21b includes a pair of pressing surfaces 21d on both circumferential end surfaces thereof.

On the other hand, the first plate 211 is provided with fixation holes 21e for fixing the friction plate 13 by the rivets 25. By contrast, the second plate 212 is provided with four assembling holes 21f in corresponding positions to the fixation holes 21e. Each assembling hole 21f enables not only each rivet 25 but also a tool for rivet swaging to penetrate therethrough.

<Hub Flange 22>

The hub flange 22 is a member for transmitting a torque, inputted thereto from the input-side plate 21, to an output-side device. As shown in FIGS. 1, 2, and 3, the hub flange 22 includes a hub 30 and a flange 40.

The hub 30 is a tubular member and is disposed within the center holes of the first and second plates 211 and 212. The hub 30 is provided with a spline hole in the inner peripheral part thereof, whereby an output-side member is enabled to be spline-coupled to the spline hole. Besides, the hub 30 is provided with eight teeth 30a and a pair of protruding portions 30b on the outer peripheral surface thereof. The pair of protruding portions 30b is disposed in opposition to each other through the rotational axis O.

The flange 40 is made in the shape of a disc as shown in FIG. 3 and is disposed axially between the first plate 211 and the second plate 212. The flange 40 includes a pair of first window holes 41a, a pair of second window holes 41b, a pair of first stopper holes 42a (exemplary cutout), and a pair of second stopper holes 42b (exemplary cutout). Besides, the flange 40 is provided with an opening in the center part thereof so as to enable the hub 30 to be inserted therein. Moreover, the flange 40 is provided with a plurality of recesses 43 that the teeth 30a of the hub 30 are engaged. Furthermore, the flange 40 is provided with openings 44 for composing part of a pair of pre-dampers 50 (to be described). It should be noted that, although not shown in FIG. 3, the pair of first stopper holes 42a is provided symmetric to each other with reference to the rotational axis O; likewise, the pair of second stopper holes 42b is provided symmetric to each other with reference to the rotational axis O.

The pair of first window holes 41a is disposed in opposition to each other through the rotational axis O, while being provided in corresponding positions to the pair of first window portions 21a of the first plate 211 and that of the second plate 212. Each first window hole 41a includes a pair of pressing surfaces 41c on both circumferential end surfaces thereof. Besides, in each first window hole 41a, circumferentially R1-side (hereinafter simply referred to as "R1 side") one of the pair of pressing surfaces 41c includes a protruding portion 41d protruding to bulge toward the other pressing surface 41c opposed thereto (i.e., in the circumferential direction).

The pair of second window holes 41b is disposed in opposition to each other through the rotational axis O, while being displaced from the pair of first window holes 41a at an angular interval of 90 degrees. In other words, the pair of second window holes 41b is provided in corresponding positions to the pair of second window portions 21b of the first plate 211 and that of the second plate 212. Each second window hole 41b is made in the shape of a rectangle, and a radial position of each second window hole 41b (the middle position of the radial width of the hole) is defined radially inside the radially center position in each first window hole 41a. Each second window hole 41b includes a pair of pressing surfaces 41f on both circumferential end surfaces thereof. The distance between the pair of pressing surfaces 41f is set to be shorter than that between the pair of pressing surfaces 21d of each second window portion 21b in the input-side plate 21.

The pair of first stopper holes 42a is a pair of elongated holes each extending in a circular-arc shape on the R1 side of each first window hole 41a. Each first stopper hole 42a is provided apart from the first window hole 41a adjacent thereto. Each first stopper hole 42a extends, at one end thereof located apart from the adjacent first window hole 41a, to a position radially outside the second window hole 41b near thereto. On the other hand, each first stopper hole 42a extends, at the other end thereof located closer to the adjacent first window hole 41a, toward the protruding portion 41d in the adjacent first window hole 41a.

The pair of second stopper holes 42b is a pair of elongated holes each extending in a circular-arc shape on a circumferentially R2 side (hereinafter simply referred to as "R2 side") of each first window hole 41a. Each second stopper hole 42b is communicated at the R1-side end thereof with the radially middle part of each first window hole 41a.

Besides, each of the first and second stopper holes 42a and 42b is provided with a protruding portion 42c on a part thereof located in the vicinity of the R2-side end thereof. The protruding portion 42c is curvedly recessed radially outward. The protruding portion 42c is provided in a corresponding position to each fixation hole 21e provided in the input-side plate 21 to fix each rivet 25. Each rivet 25 can be swaged by the tool through each protruding portion 42c and each assembling hole 21f.

The first stopper holes 42a and the second stopper holes 42b are axially penetrated by the stop pins 24, respectively. Because of this, the input-side plate 21 and the hub flange 22 are rotatable relative to each other within a range that each stop pin 24 is movable within each stopper hole 42a, 42b. In other words, the stop pins 24 and the respective first and second stopper holes 42a and 42b compose a stopper mechanism 45. The input-side plate 21 and the hub flange 22 are prevented from rotating relative to each other when each stop pin 24 makes contact with one end surface of each stopper hole 42a, 42b.

<Damper Part 23>

As shown in FIGS. 1 and 3, the damper part 23 includes a pair of coil springs 47 (exemplary elastic members), a pair of resin members 48, a pair of pre-dampers 50, and a hysteresis generating mechanism 60.

The pair of coil springs 47 and the pair of resin members 48 compose a mechanism for elastically coupling the input-side plate 21 and the hub flange 22 in the rotational direction.

—Coil Springs 47 and Resin Members 48—

The coil springs 47 are accommodated in the pair of first window holes 41a of the flange 40, respectively, whereas the resin members 48 are accommodated in the pair of second window holes 41b of the flange 40, respectively. Besides, the coil springs 47 are axially and radially supported by the pair of first window portions 21a of each of the first and second plates 211 and 212, respectively, whereas the resin members 48 are axially and radially supported by the pair of second window portions 21b of each of the first and second plates 211 and 212, respectively.

It should be noted that each resin member 48 is disposed in each second window portion 21b of the input-side plate 21 through circumferential gaps. On the other hand, each resin member 48 is disposed in each second window hole 41b of the flange 40 without any circumferential gap.

A first spring seat 71 is provided on the R1-side end surface of each coil spring 47. On the other hand, a second spring seat 72 is provided on the R2-side end surface of each coil spring 47.

The coil springs 47 and the rivets 25 are herein disposed to overlap in part an imaginary circle with a radius P defined by attachment positions of the stop pins 24.

—Pre-Dampers 50—

The pair of pre-dampers 50 composes a mechanism for elastically coupling the hub 30 and the flange 40 in the rotational direction. As shown in FIG. 3, the pair of pre-dampers 50 is disposed in opposition to each other through the rotational axis O. Each pre-damper 50 is disposed radially inside one of the pair of second window holes 41b, while being interposed between the pair of first window holes 41a. Each pre-damper 50 includes a pair of coil springs 51. The pair of coil springs 51 is disposed between one of the pair of protruding portions 30b of the hub 30 and the end surfaces of each opening 44 provided in the flange 40.

—Hysteresis Generating Mechanism 60—

The hysteresis generating mechanism 60 is disposed axially between the hub flange 22 and the first and second plates 211 and 212. The hysteresis generating mechanism 60 is composed of members including a bushing, a cone spring, and so forth. When the hub 30 and the flange 40 are rotated relative to each other, the hysteresis generating mechanism 60 generates a hysteresis torque that is relatively small in magnitude. On the other hand, when the hub flange 22 and the first and second plates 211 and 212 are rotated relative to each other, the hysteresis generating mechanism 60 generates a hysteresis torque that is relatively large in magnitude.

[Assemblage of Torque Limiter Unit 10 and Damper Unit 20]

First, in assemblage of the damper device 1, the torque limiter unit 10 and the damper unit 20 are assembled separately. Thereafter, the inner peripheral part of the friction plate 13 in the torque limiter unit 10 and the outer peripheral part of the first plate 211 are fixed to each other by swaging the rivets 25.

The second plate 212 is provided with the assembling holes 21f, whereas the flange 40 is provided with the stopper holes 42a and 42b and the protruding portions 42c. Hence, the first plate 211 and the friction plate 13 can be herein fixed to each other by inserting each rivet 25 and the swaging tool through each assembling hole 21f, each stopper hole 42a, 42b, and each protruding portion 42c and then by swaging each rivet 25 with the swaging tool.

The rivets 25 for fixing the torque limiter unit 10 and the damper unit 20 are herein fastened by utilizing the stopper holes 42a and 42b. Because of this, it is possible to overlap the inner peripheral part of the torque limiter unit 10 and the outer peripheral part of the damper unit 20, whereby compactness in size of the device can be realized.

[Actions]

A torque, transmitted from the engine to the flywheel, is inputted to the damper unit 20 through the torque limiter unit 10. In the damper unit 20, the torque is inputted to the input-side plate 21 to which the friction disc 13 in the torque limiter unit 10 is fixed. Then, the torque is transmitted to the hub flange 22 through the pre-dampers 50, the coil springs 47, and the resin members 48. Subsequently, power is transmitted from the hub flange 22 to the electric motor, the transmission, a power generator, and so forth disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 10.

OTHER PREFERRED EMBODIMENTS

The present invention is not limited to the preferred embodiment described above, and a variety of changes or modifications can be made without departing from the scope of the present invention.

(a) The specific configuration of the damper unit 20 and that of the torque limiter unit 10 are not limited to those in the preferred embodiment described above.

(b) In the preferred embodiment described above, the stopper holes 42a and 42b and the stop pins 24 compose the stopper mechanism 45. However, instead of the stopper holes 42a and 42b, cutouts may compose part of the stopper mechanism 45. Here, each of the cutouts circumferentially extends and is radially opened.

(c) In the preferred embodiment described above, the rivets 25 are each disposed in part to overlap the imaginary circle with the radius defined by the attachment positions of the stop pins 24. However, the layout of the rivets 25 is not limited to this.

REFERENCE SIGNS LIST

15 Cone spring (urging member)
21 Input-side plate (first rotor)
22 Hub flange (second rotor)
24 Stop pin
25 Rivet (fixation member)
30 Hub
40 Flange
41a First window hole
42a First stopper hole (cutout)
42b Second stopper hole (cutout)
42c Protruding portion
45 Stopper mechanism
47 Coil Spring (elastic member)

What is claimed is:

1. A torque limiter embedded damper device provided between a power source-side member and an output-side member, the torque limiter embedded damper device comprising:
    a damper unit coupled to the output-side member; and
    a torque limiter unit configured to limit a torque transmitted between the power source-side member and the damper unit, wherein
    the damper unit includes
    a first rotor having a disc shape,
    a second rotor including a flange axially opposed to the first rotor, the second rotor rotatable relative to the first rotor, the second rotor coupled to the output-side member,
    a stopper mechanism configured to restrict an angle of relative rotation between the first rotor and the second rotor to a predetermined angular range, the stopper mechanism including a cutout and a stop pin, the cutout provided in the flange, the cutout extending in a circular-arc shape, the stop pin fixed to the first rotor, the stop pin axially penetrating the cutout, and
    an elastic member configured to elastically couple the first rotor and the second rotor in a rotational direction, and
    the torque limiter unit includes
    a friction plate having an annular shape, the friction plate fixed at an inner peripheral part thereof to an outer peripheral part of either the first rotor or the second rotor by a fixation member, the fixation member fastened in a state of penetrating the cutout of the flange;
    wherein the fixation member and the elastic member are each disposed to overlap in part an imaginary circle with a radius defined by an attachment position of the stop pin.

2. The torque limiter embedded damper device according to claim 1, wherein the first rotor includes a first plate and a second plate, the first and second plates each having a disc shape, the first and second plates disposed to axially interpose the flange therebetween, the first and second plates fixed to each other by the stop pin so as to be axially immovable and non-rotatable relative to each other.

3. The torque limiter embedded damper device according to claim 2, wherein
    the friction plate is fixed to the first plate, and
    the second plate includes an assembling hole allowing the fixation member to penetrate therethrough.

4. The torque limiter embedded damper device according to claim 1, wherein
the cutout of the stop mechanism is an elongated hole having a circular-arc shape, the elongated hole provided with a protruding portion recessed radially outward from a circumferential part thereof, and
the fixation member penetrates the elongated hole and the protruding portion.

5. The torque limiter embedded damper device according to claim 1, wherein the torque limiter unit includes
a fixation plate fixed to the power source-side member,
a pressure plate configured to press the friction plate against the fixation plate, and
an urging member configured to press the friction plate against the fixation plate through the pressure plate.

6. A torque limiter embedded damper device provided between a power source-side member and an output-side member, the torque limiter embedded damper device comprising:
a damper unit coupled to the output-side member; and
a torque limiter unit configured to limit a torque transmitted between the power source-side member and the damper unit, wherein
the damper unit includes
a first rotor having a disc shape,
a second rotor including a flange axially opposed to the first rotor, the second rotor rotatable relative to the first rotor, the second rotor coupled to the output-side member,
a stopper mechanism configured to restrict an angle of relative rotation between the first rotor and the second rotor to a predetermined angular range, the stopper mechanism including a cutout and a stop pin, the cutout provided in the flange, the cutout extending in a circular-arc shape, the stop pin fixed to the first rotor, the stop pin axially penetrating the cutout, and
an elastic member configured to elastically couple the first rotor and the second rotor in a rotational direction, and
the torque limiter unit includes
a friction plate having an annular shape, the friction plate fixed at an inner peripheral part thereof to an outer peripheral part of either the first rotor or the second rotor by a fixation member, the fixation member fastened in a state of penetrating the cutout of the flange;
wherein
the cutout of the stop mechanism is an elongated hole having a circular-arc shape, the elongated hole provided with a protruding portion recessed radially outward from a circumferential part thereof, and
the fixation member penetrates the elongated hole and the protruding portion.

\* \* \* \* \*